United States Patent
Flataker et al.

(10) Patent No.: US 11,406,200 B2
(45) Date of Patent: Aug. 9, 2022

(54) DEVICE FOR AUTOMATIC ROCKING OF BABY BUGGIES

(71) Applicant: Babliss AS, Asker (NO)

(72) Inventors: Ståle Flataker, Asker (NO); Emil Abry, Hosle (NO); Christopher Kavanagh, Oslo (NO); Christian Abry, Eiksmarka (NO); Bård Sagstad, Bergen (NO)

(73) Assignee: Babliss AS, Asker (NO)

( * ) Notice: Subject to any disclaimer, the term of this patent is extended or adjusted under 35 U.S.C. 154(b) by 533 days.

(21) Appl. No.: 16/492,056

(22) PCT Filed: Mar. 9, 2018

(86) PCT No.: PCT/NO2018/050066
§ 371 (c)(1),
(2) Date: Sep. 9, 2019

(87) PCT Pub. No.: WO2018/164584
PCT Pub. Date: Sep. 13, 2018

(65) Prior Publication Data
US 2020/0037783 A1  Feb. 6, 2020

(30) Foreign Application Priority Data
Mar. 10, 2017 (NO) .................................. 20170363

(51) Int. Cl.
*A47D 9/04* (2006.01)
*H02K 7/06* (2006.01)
(Continued)

(52) U.S. Cl.
CPC .................. *A47D 9/04* (2013.01); *B06B 1/16* (2013.01); *B62B 9/22* (2013.01); *H02K 7/061* (2013.01)

(58) Field of Classification Search
CPC . H02K 7/00; H02K 7/06; H02K 7/061; A61H 23/00; A61H 23/02; A61H 23/026;
(Continued)

(56) References Cited

U.S. PATENT DOCUMENTS 2,649,167 A   8/1953 Strom et al.
3,820,614 A * 6/1974 Askinazy .................. B62B 9/22
                                               180/166
(Continued)

FOREIGN PATENT DOCUMENTS

CN         2724694 Y    9/2005
CN       101407231 A    4/2009
(Continued)

OTHER PUBLICATIONS

Wilhelmsen Hodneland, John André; International Search Report for PCT/NO2018/050066; dated May 28, 2018; 3 pages.

*Primary Examiner* — Tran N Nguyen
(74) *Attorney, Agent, or Firm* — Shackelford, Bowen, McKinley & Norton, LLP

(57) ABSTRACT

A rocking device provided with a fastening means (9) for mounting to for example a baby buggy to create an automatic rocking movement of the baby buggy. It comprises a rotating, asymmetrical weight (14) driven by an electric moto (24). The motor and weight are suspended in a rigid fastening bracket. The fastening bracket (13) is fastened to a first side of a vibration dampening connection element (3) of an at least partly soft material. The fastening means is fastened to the other side of the vibration dampening connection element (3), such that the movement of the weight is transmitted through the fastening bracket (13), via the vibration dampening connection element (3) and the fastening device, to the baby buggy. The fastening bracket with motor a weight is enclosed by an outer cover (1, 2) which is not in contact with the fastening bracket, motor or weight.

(Continued)

The outer cover is fastened to the vibration dampening connection element (3), such that vibrations from the motor and the weight are not transmitted to the outer cover.

10 Claims, 4 Drawing Sheets

(51) Int. Cl.
    *B62B 9/22*     (2006.01)
    *B06B 1/16*     (2006.01)

(58) Field of Classification Search
    CPC ...... A61H 23/0263; A61H 1/00; A61H 1/005; A47D 9/00; A47D 9/04; B06B 1/16; B62B 9/22
    USPC .............................. 310/15, 17, 20, 36, 37, 51
    See application file for complete search history.

(56) References Cited

U.S. PATENT DOCUMENTS

| | | | |
|---|---|---|---|
| 4,587,863 A | 5/1986 | Wadensten | |
| 7,485,086 B2* | 2/2009 | Dickie | B60N 2/2821 |
| | | | 600/28 |
| 9,027,689 B1* | 5/2015 | Brien | B62B 9/22 |
| | | | 280/47.38 |
| 2006/0012230 A1 | 1/2006 | Kennedy et al. | |
| 2012/0071253 A1 | 3/2012 | Qiu | |
| 2012/0180239 A1* | 7/2012 | Byrne | A47L 11/26 |
| | | | 74/61 |
| 2013/0213159 A1 | 8/2013 | Wu | |
| 2013/0225913 A1 | 8/2013 | Dunn et al. | |
| 2015/0040315 A1* | 2/2015 | Gersin | A47C 21/006 |
| | | | 5/417 |

FOREIGN PATENT DOCUMENTS

| | | |
|---|---|---|
| CN | 201590708 U | 9/2010 |
| CN | 102151030 A | 8/2011 |
| CN | 102969829 A | 3/2013 |
| CN | 202872551 U | 4/2013 |
| CN | 102969829 B | 7/2016 |
| CN | 205814072 U | 12/2016 |
| DE | 2552206 A1 | 6/1977 |
| DE | 3437298 A1 | 4/1986 |
| DE | 19635978 A1 | 3/1998 |
| DE | 19800586 A1 | 7/1999 |
| DE | 102008016959 A1 | 11/2009 |
| DK | 201100097 U3 | 9/2012 |
| EP | 1902924 A1 | 3/2008 |
| EP | 2048072 B1 | 8/2014 |
| FR | 2369813 A1 | 6/1978 |
| GB | 2219199 A | 12/1989 |
| WO | WO-9817155 A1 | 4/1998 |
| WO | WO-2012164554 A1 | 12/2012 |

* cited by examiner

DEVICE FOR AUTOMATIC ROCKING OF BABY BUGGIES

TECHNICAL FIELD

In many countries, it is normal procedure to place small children in baby buggies to sleep. In order to ease the child's sleep, or in cases where the child awakens after a short period of sleep, it is usual that the care person rocks the buggy with rhythmical movements to calm down the child. Many people experience that this rocking movement is the most advantageous method to calm down the child, since it is not desirable to take the child up from the buddy and thereby disrupt the sleep. However, it can be time consuming and laborious for the care person. Especially in cases where the child has problems to sleep or colic and cries a lot, this will be experienced as an additional burden and exhausting for the care person.

The invention relates to a device designed to create an automatically calming rocking movement when it is fastened to the baby buggy.

BACKGROUND ART

It is known several different solutions to provide an automatic rocking movement, but these have several disadvantages that do not make them suitable.

The solution described in patent application DE 19800586 is not suitable due to its size and lack of mobility and its unpractical transfer of movement between motor and flywheel to the unit to be rocked.

The solution described in patent application DE3437298 is simpler and more compact, but it is based on a permanent installation on a scissor shaped frame geometry which is no longer in use, and which consequently is not suitable to fulfil the requirements of todays market. In addition, this solution requires tools during assembly and gives little flexibility.

The solution described in patent application DE 102008016959 is compact and handy with regards to fastening to some types of baby cradles, but the construction is based on an electromagnetic principle which requires lot of energy to provide a satisfactory movement and will therefore have shorter period of use before recharging is necessary. The components required in the assembly are costly and it is difficult to give a low retail price to the customer. With its oblong shape, the solution requires a long, straight tube section for fastening and it is therefore difficult to fasten to modern collapsible aby buggies having tubes which are often rounded in a large radius. The solution is provided with straps and burr fasteners for fastening. For effective transmittal of movement, the straps must be tightened hard and retightened regularly to maintain the effect. This is an impractical solution which during use will have a reduced performance since the unit will loosen.

WO 98/17155 shows a rocking device which can be mounted on a baby buggy or child seat. It comprises a weight with an unbalanced mass which is driven by an electric motor. Motor and weight are provided in a house which can be fastened to for example a handle on a baby buggy via a bracket.it also comprises sensors for activating the motor based on movement or sound from the child.

Motor and weight are mounted in the house by means of rotational bearing. These bearing will transmit all vibrations from the motor to the housing. The housing is fixed to the handle of the baby buggy and thereby all the noise from the motor will be transmitted both to the housing and the handle. This noise will probably have a small effect on the child, but however it could have an enervating effect on adults near the baby buggy. If the vibration device is used in the public sphere, such as a café or a library, this noise will be disturbing for the environment.

DE 2552206 describes a rocking device which also comprises an electric motor driving a rotating mass. It is here stated that the motor should be elastically mounted to prevent transmission of sound vibrations. Even though this will dampen the noise from the drive gear to a certain degree, it will only be the noise from the motor itself that is partly dampened. Noise from the remaining drive gear will be transmitted to the housing and partly also noise from the motor, which will propagate vie the drive shaft to the remaining drive gear.

US 2006/012230 also describes a rocking device where the motor is elastically mounted. Of the same reason as above, this will only partly reduce transmittal of unwanted vibration and noise.

US 2013/225913 shows a vibration device where the complete motor a drive gear is enclosed in an elastic pillow. In this device, also the housing is flexible. Here, the vibrations from the motor and drive gear will be dampened relatively effectively, but this will affect the device's ability to transmit rocking movements to a baby buggy for example. Thereby it is also stated that the device preferably should be placed underneath a mattress. Direct contact between the device and the mattress will increase the transmittal of vibrations from the device. It should also be noted that by using this device, it is vibrations that are transmitted, not a rocking movement.

Other known rocking devices are known from CN 202872551U, U.S. Pat. No. 2,649,167, DE 19635978, DK 201100097U, WO 2012/164554, US 2012/071253, FR 2369813, GB 2219199, CN 102151030, CN 201590708U and U.S. Pat. No. 4,587,863.

It has been a very limited circulation of the above and other solutions in the market, which among others is due to unpractical solutions at high costs, weak effect, complicated mounting and short service life before recharging.

Consequently, there is a long-sought need for a more suitable solution such as achieved according to the present, with a practical, compact and quiet-running unit which creates an effective rocking motion in a baby buggy and which is simple to install to all types of baby buggies and which can be produced in a commercial and rational way. In addition, it is important that the function creating the rocking movement does not require so much electric power that the unit must be re-charged or the batteries must be replaced frequently.

THE PURPOSE OF THE INVENTION

The purpose of the invention is to provide a divide for automatic rocking of baby buggies which A) fit all types of baby buggies, which B) provides an effective rocking movement with long service life, which C) is reasonably priced since its due to its constructions makes it possible to use a low cost and standard electro motor and which is assembled of reasonably priced components in a way that gives a low sound level, low wear and tear and long service life, and which D) is water proof and can be used in all kinds of weather, and which E) is fastened in a way that requires low force but gives a tight connection which does not require re-tightening, and which F) has a simple user interface and G) has an electronic circuit board with sensors that intercepts sound and movement and is programmed to start rocking movement automatically when the child is crying or moves, and can have a communication unit on the circuit board, for example of Bluetooth-type, which can communicate with an application on the smartphone of the care person and surveille and notify the child's condition via this.

In the description and claims the terms "baby buggy", "rocking motion", "electro motor", "fastening device", "ball bearings", "weight", "sensor" should be interpreted in their broadest sense of the respective terms and includes all similar elements which are known within the field with other terms, which will be obvious for a skilled person in the art. If the description has any limitations, these are only given as examples and for understanding of present invention.

SUMMARY OF INVENTION

Device for automatic rocking of baby buggies with an electromotor driving an asymmetrical weight around an axle which creates a rocking movement which is transferred via a rigid inner fastening bracket to the handle of a baby buggy. The connection between motor and weight passes through a flexible joint ensuring that motor sound is not amplified and can skid and thereby save the motor by a too heavy load The device has to outer covers which are fastened to a vibration dampening connecting element and which on top has a fastening device with a ratchet strap and buckle that ensure a tight fastening to the handle of a baby buggy.

DETAILED DESCRIPTION OF THE INVENTION

Figure 1:
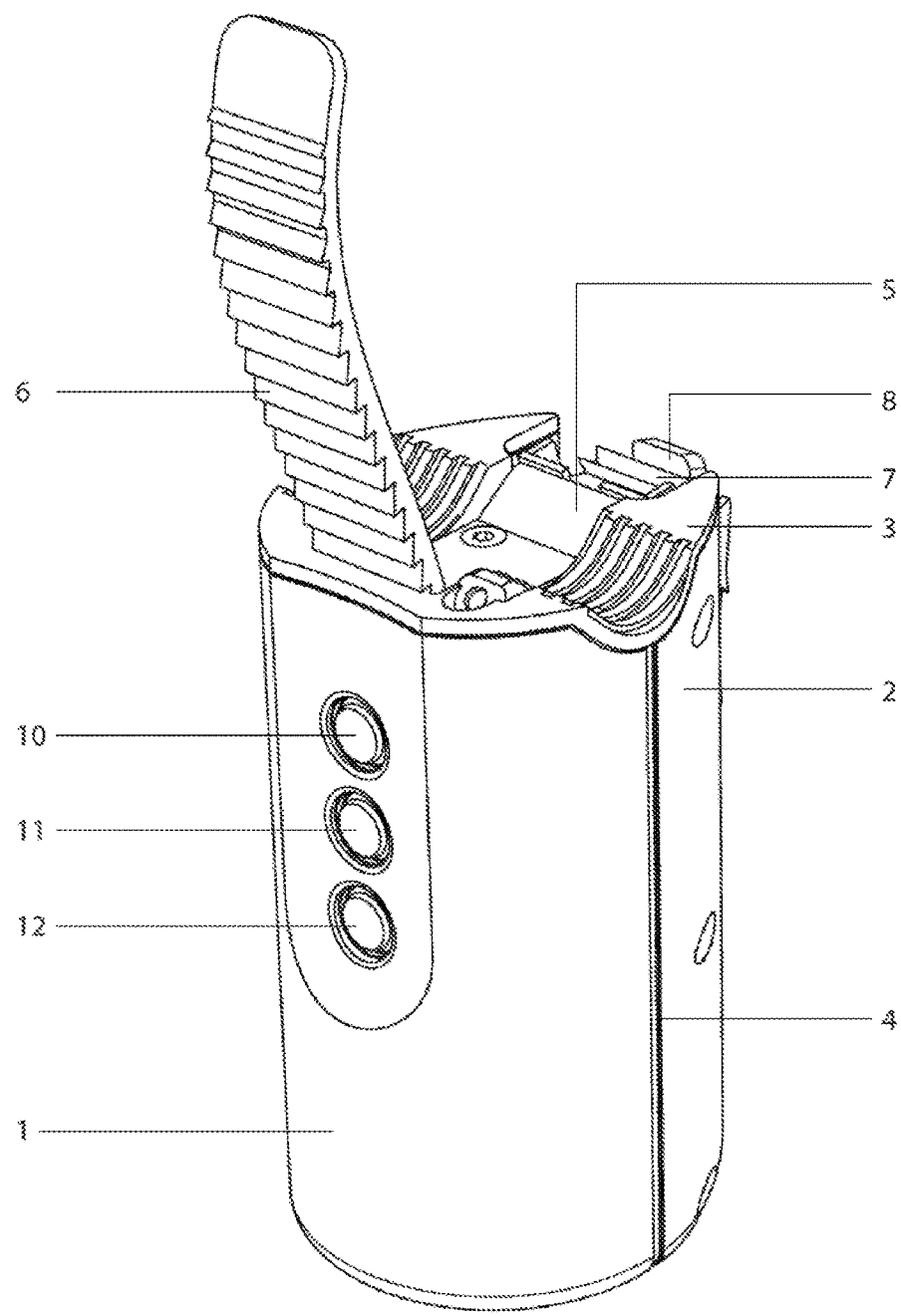
FIG. 1 is a perspective view of a preferred embodiment of the invention seen from outside.

The following describes a preferred embodiment of the present invention, which is only a non-limiting description for understanding the invention.

When the following description refers to terms as "front", "rear", "upper" or "lower" or corresponding terms, these only refer to the orientation as shown in the drawings. It should be understood that the orientation can be different from the drawings without departing from the principles of the invention.

FIG. 1 is a perspective view of a preferred embodiment of the invention seen from the outside.

It comprises a front cover (1) and a rear cover (2) for example made of hard plastic, and a vibration dampening connection element (3) for example made of a partly soft elastomer. Squeezed between the front cover (1) and rear cover (2) is a gasket (4) of a suitable gasket material for example of a soft elastomer which seal against ingress of moisture between the parts. The gasket can be integrated in, for example molded with one of the covers.

A fastening device (9) made up of a ratcheting buckle (5) where it is fastened a ratchet strap (6) and a ratcheting bracket (7) with a release part (8), provides a flexible and easy assembling and disassembling of the unit to a suitable tube part on the baby buggy. On the front cover (2) it is provided three push buttons (10, 11, 12) controlling the different functions of the unit.

Figure 2:
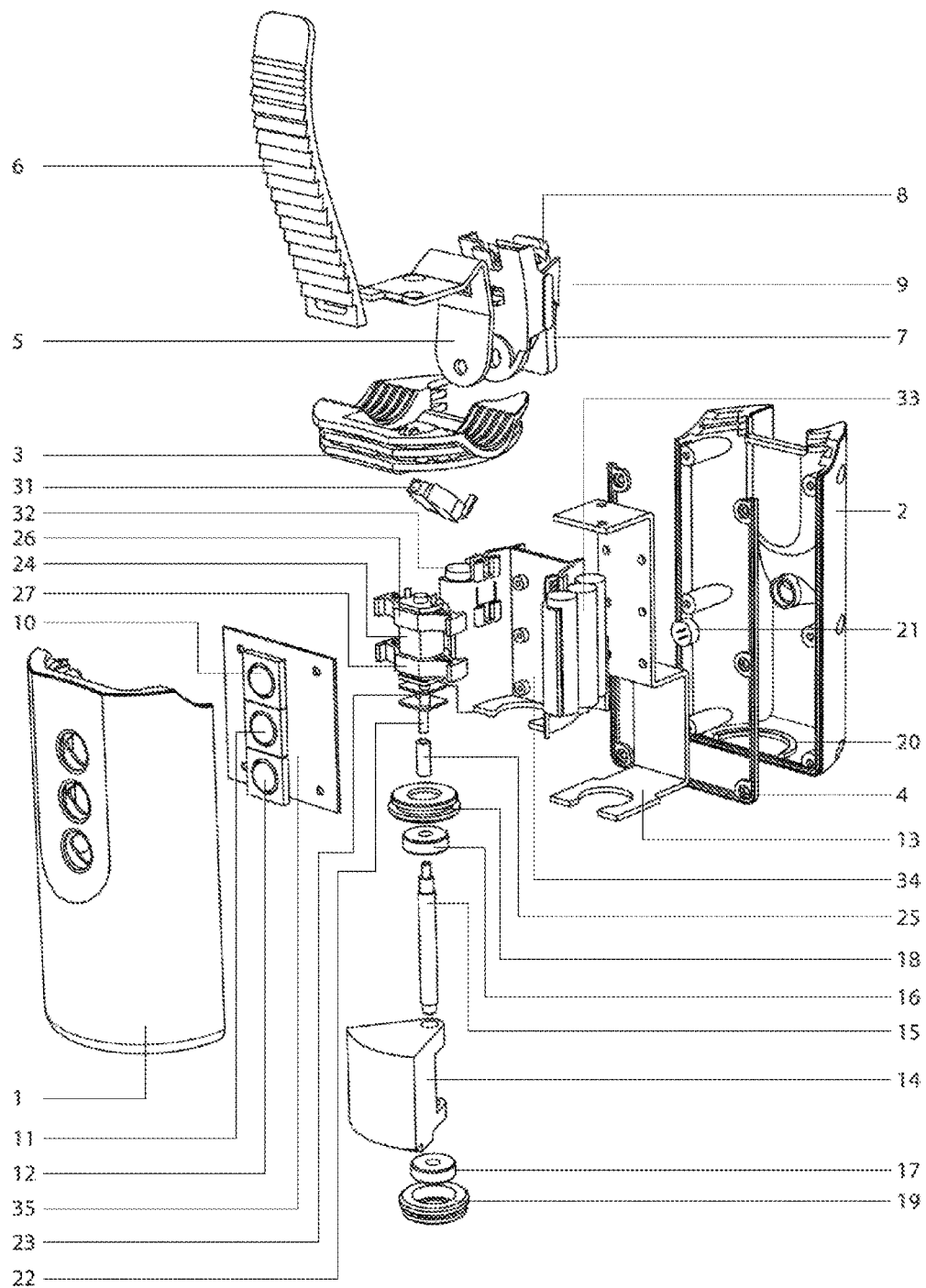
FIG. 2 is an exploded view of the same embodiment of the invention.

FIG. 2 is an exploded view of the inner structure of the same preferred embodiment. It comprises a central and rigid fastening bracket (13) made of a rigid material, for example steel, to which all parts are directly or indirectly fastened to. The purpose of the rigid central bracket (13) is to transfer the rocking movement provided by the weight (14) when it rotates on the shaft (15) as directly as possible to the handle of baby buggy. The shaft (15) is suspended by and runs trough the ball bearings (16, 17) kept in position in vibration dampening bushes (18, 19), for example made of soft or partly soft elastomer. The upper vibration dampening bush (18) is mounted on battery and motor cage (34) which again is fastened to the central bracket (13). The weight (14) which is fastened between roller bearings (16, 17) on the lower part of the shaft, and having an asymmetrical design with approximately all mass concentrated in a sector between 30 and 180 degrees, or more preferred between 45 an d90 degrees, and with the main section of the mass provided so far out from the shaft (15) as allowed by the outer geometry of the unit. The weight (14) is made of a material with high specific gravity, for example brass, to give a large deflection as possible in the rocking movement. The shaft (15) is connected to the motor shaft (22) from the electric motor (24) which can be with or without a gearbox (23), via e flexible coupling (25). For example made of a soft or partly soft elastomer, which dampens the start of each staggering movement in that the shaft (15) twists and will underlie the movement of the shaft (14) in the rotational direction and will thereby not expose the motor gearbox (23) directly for the weight's (14) jerkily and start and stop movements which else had caused great wear and tear of the electric motor (24) and/or the gearbox. The shaft (15) twists back to the starting point when the movement of the weight (14) is diminishing and the torsion load on the shaft (15) ceases.

The electric motor (24) with or without the integrated gearbox (23) is a noise source, and this unit is therefore suspended in one or more enclosing elastic motor suspension (26, 27), for example made of a soft or partly soft elastomer, which is fastened to the rigid bracket (13) or fastened to a battery or motor cage (34) fastened to the rigid bracket (13), such that noise causing vibrations are damped and will not be transferred further and amplified.

The motor suspension (26, 27) is provided with two or more fixation points and can be designed as protruding arms (28, 29) to increase the elasticity and the dampening effect. The protruding arms (28, 29) can have a homogenous cross-section or can be provided with details, for example incisions (30) to increase the elasticity further.

The drawing shows a circuit board (35) and three push buttons (10, 11, 12) having the following functions: 1) ON (and to increase the speed when the device is in use) 2) OFF (and to reduce the speed when the unit is in use) 3) OFF/ON of sensor mode. The circuit board (35) is in this embodiment provided on the inside of the outer cover (1).

The drawing shows the charging contact (31) and two rows of rechargeable batteries (32, 33) which is fastened to a battery—and motor holder (34). In another embodiment, the charging contact (31) is provided beneath the fixation point to the tube of the baby buggy to prevent that the unit can be re-charged when it is fastened to the baby buggy, and additionally that the charging contact is protected against fall of rain when the unit is in use. In another embodiment the unit can be provided with exchangeable batteries and a cover protecting these. The circuit board (35) is connected to the motor (24), batteries (32, 33), sonic sensor (21) and the charging contact (31) by one or ore cables (not shown in the drawings).

Figure 3:
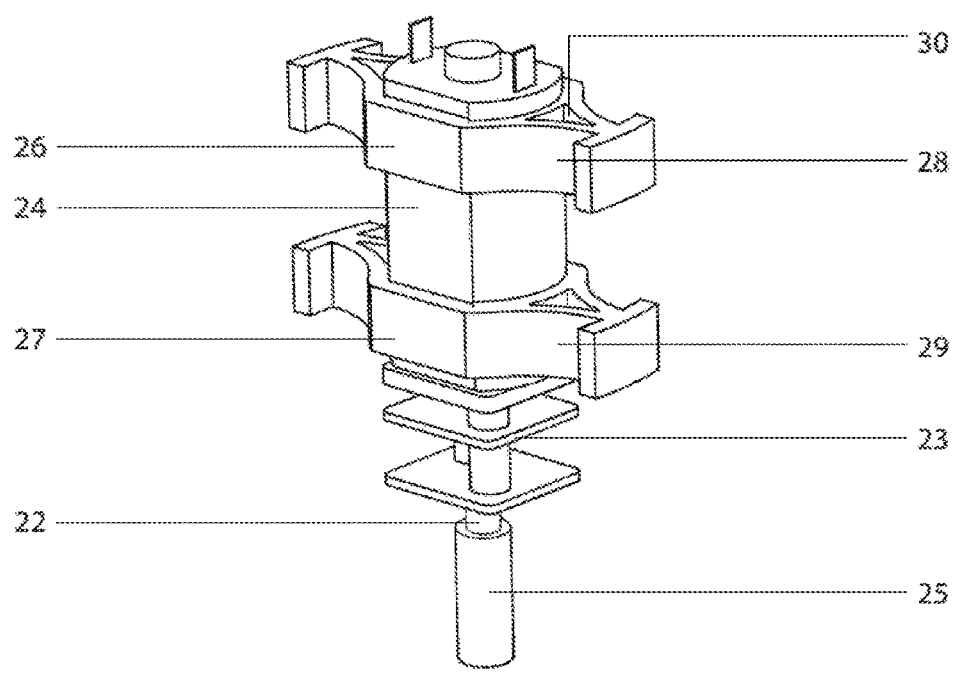
FIG. 3 shows only the motor and the motor suspension alone as described in the same embodiment of the invention.

FIG. 3 shows an enlarged view of the motor (24) and motor suspension (26, 27).

Figure 4:
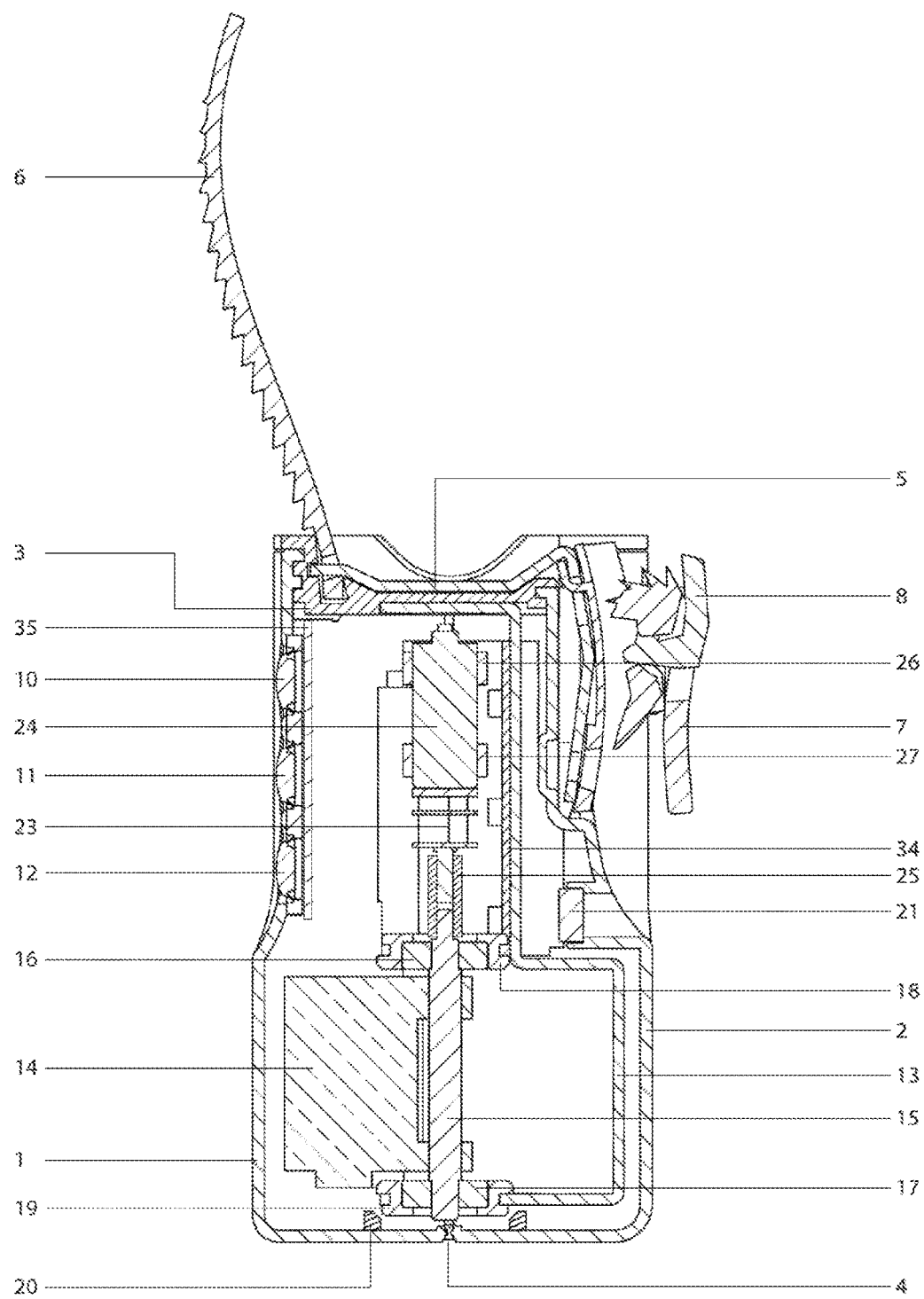
FIG. 4 shows a cross-section through the middle of the same embodiment of the invention.

FIG. 4 is a cross-section view through the middle of the unit for the same preferred embodiment and shows how the shaft (15) is mounted in the roller bearings (16, 17) and how it is connected to the motor shaft (21) from the gearbox via the flexible coupling (24) in one end and how it is mounted in the conic roller bearing (17) in the other end. The vibration dampening bush (19) of the roller bearing (17) is enclosed, but not in touch, with a flange (20) protruding from the inside of the front (1) and rear (2) cover. The flange (20) delimit the possible movement of vibration dampening bush (19) out of its centered position if the unit falls down on a hard base. Consequently, this prevents the fastening bracket (13) and weight (14) from coming into contact with and damage the outer covers (1, 2). Contact between the vibration dampening bush (19) and the flange (20) in the outer covers (1, 2) shall cease after the drop is over in that the vibration dampening bush (19) will center itself again.

The drawing shows a sonic sensor (21) which pick up screams from the child and sends a signal to the control unit that immediately is programmed to start the rocking movement if the sensor function has been activated with button (12). The unit can be programmed such that the rocking movement proceed for a predetermined time (for example 10 minutes) before the motor is turned off and the sensor again listens for sounds from the child. It is also easy to provide the invention with a movement sensor (not shown in the drawings here) which reacts when the child starts to sleep uneasy and start to wake up. It is preferred that the sonic sensor (21) is pointing towards the child when the device is fastened to the baby buggy. In this embodiment, the sonic sensor (21) is provided on the unit on the opposite side of the buttons (10, 11, 12), since it is most probable that these are pointing towards the care person when the unit is mounted to the baby buggy.

The covers (1, 2) and gasket (4) enclose, but is not in contact with, the inner construction and is mounted with a vibration dampening connection element (3) lying squeezed between the rigid fastening bracket (13) of the inner construction and the ratcheting bracket (5) of the fastening device (9), such that a little as possible vibrations and sound are transmitted to the covers (1, 2).

The preferred embodiment of the invention has several advantages.

The main function of the invention is to calm down the child, and it is therefor important that the rocking movement does not make noise that can disturb the child. All elements that can create or transmit noise by its own movement or contact with other movable parts are therefore mounted with fasteners giving god noise and vibration dampening effect and makes the unit virtually noiseless.

The embodiment allows use of a reasonably priced and noisy motor (24) since the suspension of this is effectively vibrationally damped, in addition to that the noise from the motor is shielded by the outer covers (1, 2) which are only fastened to each other and up against a soft and elastic connection element (3), and a such is not in contact with the unit's inner structure and noise creating parts. It is also possible to combine the outer covers (1, 2) to a component which only is fastened to the soft and elastic connection element (3) and as such is not in contact with the unit's inner structure and noise creating parts.

The design allows the use of a cheap gearbox (23) to achieve optimum rotational speed, e.g., between 50 and 240 revolutions per minute, because the power exchange between the shaft (15) of the weight and the shaft (25) of the gearbox is via a flexible and twistable coupling (25), which dampens the movements and spares the gears of the gearbox of wear.

The embodiment has a fastening device (6, 7, 8) which fits all types of baby buggies, and which can be mounted in areas which are not in the way normal use and handling of the buggy. The ratcheting bracket (7) makes it possible to obtain a tight fixation with use of a small power, and thereby an as effective as possible transfer of movement from the unit to the buggy.

The unit can be mounted vertically, i.e. perpendicular, from the fastening tube on the baby buggy, or in an angle out from the vertical plane. When the unit is fastened in an angle, the force of the movement increases, since the weight (14) must overcome an ascent for each rotation, and thereafter higher speed in the subsequent descent. If the angel becomes too large, the motor (24) will not be able to lift the weight (14). The flexible coupling (25) will then start to skid/spin, i.e. slide around without intervention, and thereby spare the motor (24) from over-heating and permanent function failure.

The unit can also be provided with a communication unit on the circuit board (not shown in the drawings) for example of Bluetooth-type, which can communicate with an application on the care person's smartphone and surveille and notify about the child's condition via this.

The unit according to the inventions is primarily adapted to use on baby buggies, but is not limited to this, since it due to its flexible mounting also can be mounted on other products, in which the child can sit or lie, where it is possible to create a rocking movement.

The present invention has been explained with reference to a preferred embodiment to give a better understanding of the invention and it will be obvious for a skilled person that the present invention includes all legal modifications within the scope of what is described here and in the accompanying patent claims.

LIST OF REFERENCE NUMERALS 1 front cover
2 rear cover
3 vibration dampening connection element
4 gasket
5 ratcheting bracket
6 ratchet strap
7 ratcheting bracket
8 releaser
9 fastening device
10 push button upper
11 push button middle
12 push button lower
13 fastening bracket
14 weight
15 shaft
16 roller bearing upper
17 roller bearing lower
18 vibration dampening bush upper
19 vibration dampening bush lower'
20 flange
21 sonic sensor
22 motor shaft
23 gearbox
24 electric motor
25 flexible coupling
26 motor suspension upper
27 motor suspension lower 28 protruding arms upper
29 protruding arms lower
30 incision
31 charging contact
32 batteries left
33 batteries right
34 battery and motor holder
35 circuit board

The invention claimed is:

1. A rocking device provided with a fastening means for mounting to for example a baby buggy to create an automatic rocking movement of the baby buggy, wherein to create rocking movement the rocking device comprises a rotating asymmetrical weight driven by an electric motor; wherein the motor and the weight are suspended in a rigid fastening bracket, wherein the fastening bracket is fastened to a first side of a vibration dampening connection element of an elastomeric material having predetermined softness; that the fastening means is fastened to the other side of the vibration dampening connection element, such that the movement of the weight is transmitted through the fastening bracket via the vibration dampening connection element and the fastening means to the baby buggy; wherein the fastening bracket with the motor and the weight is enclosed by an outer cover that is not in contact with the fastening bracket, the motor or the weight; and wherein the outer cover is fastened to the vibration dampening connection element, such that vibrations from the motor and the weight are not transmitted to the outer cover.

2. The rocking device according to claim 1, wherein the electric motor if fastened to the fastening bracket, possibly via a battery and motor holder which in turn is fastened to the fastening bracket at the vibration dampening motor suspension.

3. The rocking device according to claim 2, wherein vibration dampening motor suspension comprises several arms extending between the motor and the fastening bracket or possibly between the motor a battery- and motor holder.

4. The rocking device according to claim 3, wherein arms comprise weakening details in the form of cut outs to increase the elasticity of the arms.

5. The rocking device according to claim 1, wherein the weight is rotationally connected with the motor via a shaft and that the shaft comprises a flexible joint.

6. The rocking device according to claim 5, wherein the flexible joint comprises an elastomer.

7. The rocking device according to claim 1, wherein the weight has an asymmetrical design with approximately all mass concentrated in a sector between 30 and 180 degrees.

8. The rocking device according to claim 1, wherein the outer cover is in a two-part form and the parts are to be connected with a gasket in between.

9. The rocking device according to claim 1, wherein it is provided with an electronic control system with sensor and software, to intercept movements and/or sound from a child and automatically start the rocking movement when the child is moving and/or cries, and stop the rocking movement again after a predetermined time.

10. The rocking device according to claim 9, wherein the sensor is provided in the outer cover.

\* \* \* \* \*